Patented Oct. 24, 1933

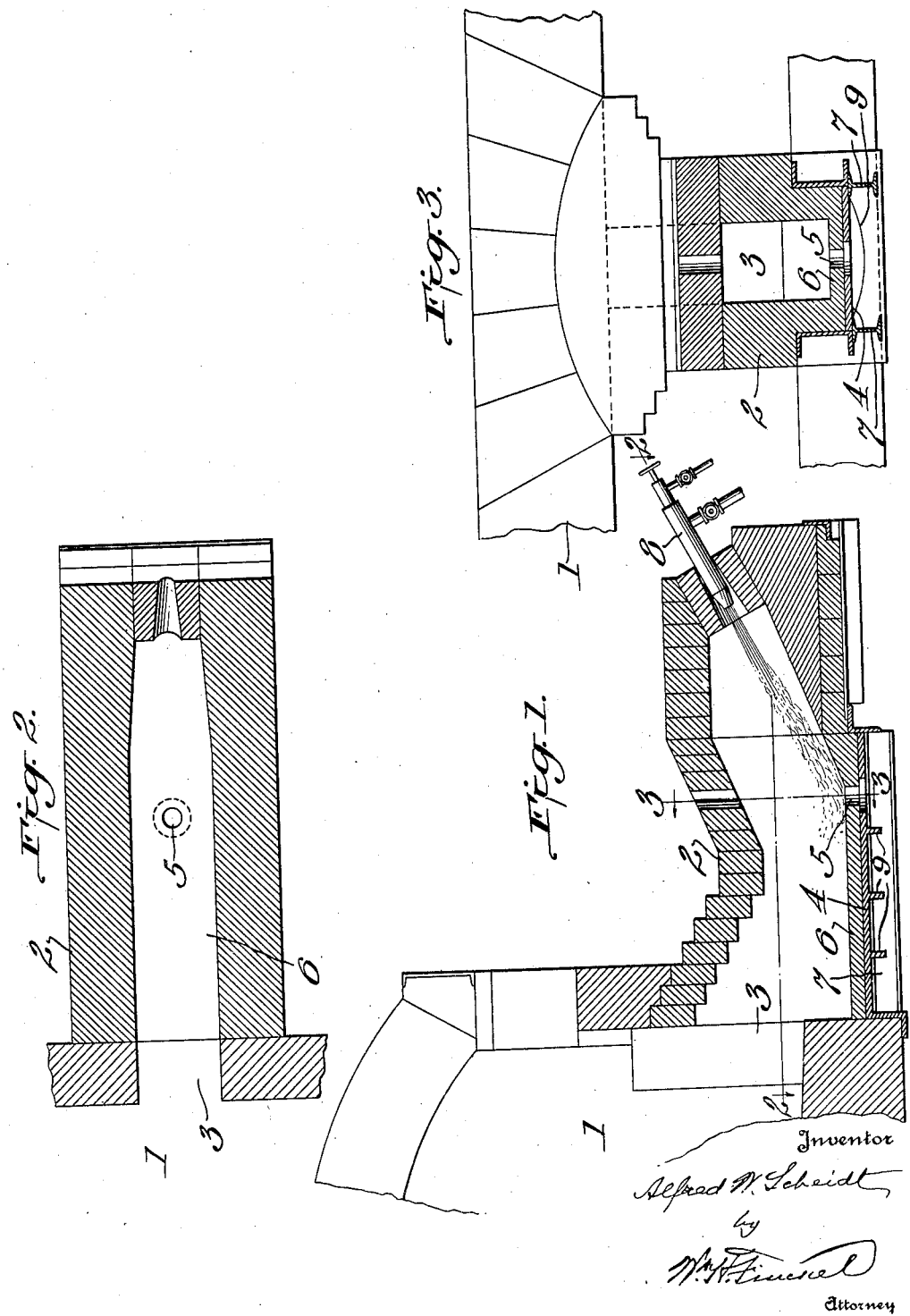

1,932,355

UNITED STATES PATENT OFFICE 1,932,355

MELTING FURNACE WITH SECONDARY HEATING FEATURES

Alfred W. Scheidt, Sewaren, N. J., assignor to The Electric Smelting & Aluminum Company, Cleveland, Ohio, a corporation of Ohio Application March 7, 1930. Serial No. 434,130

1 Claim. (Cl. 49—55)

My invention relates to melting furnaces, and particularly to the construction of the tap hole and to the method of keeping said tap hole clear and always open.

The object of my invention is to provide a melting furnace in which a batch or charge can be placed and melted and tapped out continuously, until the batch is nearly melted out, and then supplying a new batch and repeating.

The invention consists of a melting furnace from which the molten material flows to a bay in the bottom of which is an always-open tap hole which is kept clear and open by a secondary burner, thus providing a means for keeping the molten material fluent and the tap hole open, as I will proceed now more fully to explain and finally claim.

In the manufacture of the product of the patent of Alfred H. Cowles, No. 1,745,844, dated February 4, 1930, sodium silico aluminate, sodium meta silicate and other similar substances comprising, in the first case, the mixing in suitable proportions of silica, alumina and alkali metal carbonate, and in the second case of silica sand and alkali metal carbonate, and then heating to fusion and reaction, it has been found that by such heating to fusion the reaction takes place to completion, and the desired product can be drawn off at once. It has also been found that when such charges are melted and retained, even for a short time, in a furnace, in the form of molten liquid, such liquid is extremely corrosive to the tank blocks which usually form the bottom and sides of such furnace and it is necessary to shut down such furnace for repairs at frequent intervals.

The customary furnace used in such manufacture is of the reverberatory type and is commonly regenerative. The charge is added to the furnace through holes in the roof or arch of the furnace and the material after melting is tapped through a hole or slot in the lower end of the furnace, which hole or slot is plugged with brick or fire clay or similar stopper while the charge is melting. The furnace is not tapped until substantially all of the charge is melted and so for all the time during which the charge is melting the side blocks and part of the hearth are in contact with the extremely corrosive molten material, which accordingly eats through the blocks in a short time. Further, when the charge is tapped a large quantity of molten material must be handled at once.

In the furnace of my invention, I reduce the corrosive effect of the molten pool or bath by preventing formations of such pools, since I draw off or tap the material as fast as it forms, by maintaining open a small tap hole as an outlet in the lower part of the furnace. Thus I am able to melt out the charge at a regular rate, practically continuously by controlling the temperature of the main furnace chamber, and my tap hole bay, and do not have to handle any large quantity of molten liquid at once such as would be necessary if the batch were melted completely before tapping.

In the accompanying drawing illustrating the invention, in the several figures of which like parts are similarly designated, Figure 1 is a longitudinal section of part of a melting furnace with the bay and secondary burner installed. Fig. 2 is a horizontal section on line 2—2 of Fig. 1, and Fig. 3 is a vertical cross-section on the line 3—3 of Fig. 1.

The furnace and its bay and the construction and lining of the bay are substantially the same as these parts shown in my concurrent case entitled Melting furnaces and method of constructing and operating same, Serial No. 434,129, filed March 7, 1930, excepting for the addition herein of the secondary burner.

The furnace of my invention is here shown in part as a reverberatory furnace 1, with a front bay 2, in open communication through mouth 3 with the reverberatory furnace. In this bay the bottom is made of cast iron or cast steel plates 4, or at least that portion of the bottom which is principally exposed to the corrosive action of such molten materials, the area around and behind the tap hole 5. On such plates I place a refractory lining 6, which may be of any good quality of dense fire brick. The plates are supported above the floor or ground level by beams 7.

The corrosive hot liquid material flowing over such plates and lining soon largely eats away such lining, and replaces it with an accumulation of material chilled in place by the relatively cooler iron or steel, or else by an accumulation of molten material or both. In any case, the result is to protect the plates from the oxidizing and burning effect of the hot furnace gases on exposed hot iron or steel.

The purpose of placing the refractory lining on such metal bottom, is to protect the metal plates from the oxidizing or burning effect of hot gases during the time when the furnace is being heated up.

The metal plates may be cooled by contact with the atmosphere on their lower sides, by blowing air against them, or they may be designed to be cooled by water as required in special cases. I have found even the first method satisfactory when the plates are properly designed with stiffening and radiating fins 9 to resist warping and to facilitate cooling of the plates.

In the outer upper end of this bay above the tap hole is placed the secondary burner 8 at a downward incline. This burner may be of any usual or approved type, and it is shown as a liquid fuel force-feed or atomizing style.

I have found that when a reverberatory furnace is constructed with a small tap hole intended to be open continuously so as to permit material to flow out as fast as it melts and flows, the draft required to take care of the products of combustion and reaction in the melting chamber causes an inflow current of cold air through the tap hole which chills the outflowing molten material and soon causes the tap hole to plug up with chilled material. I therefore mount, preferably in the end of the bay, in a position above the normal level therein of the molten material, the small secondary burner 8, and so build up the small bay or burner arch communicating with the main furnace chamber that the flame supplied by this burner will be localized around the tap hole. Moreover, the axis of the burner 8 is so arranged that the flame projected by the burner may and preferably does impinge directly upon the lip of the tap hole, thus preventing the entrance therethrough into the bay of relatively cold air and the formation of a tap hole plug of the molten material chilled by such air. Furthermore, in normal operation, the flame of the secondary burner not only heats the tap hole proper and the immediately surrounding area, but passes in part through the tap hole, thus maintaining the material in a molten state up to the time when it is desired that it be chilled, and insuring its free flow through the tap hole and forestalling possibility of the formation of an undesirable tap hole plug. I am also able to control the rate of flow of the molten material through the tap hole, since by increasing the temperature of the tap hole bay I can increase the temperature of the flowing stream of molten material and so make it more fluid and cause it to flow faster, and, conversely, I can reduce the temperature and cause it to flow slowly and sluggishly.

Variations in the details of construction and arrangement of parts are permissible within the principle of the invention and the scope of the claim following.

What I claim is:

The process of preparing fused material in a melting furnace having an auxiliary chamber in communication therewith provided with a bottom metal plate having a tap hole, which comprises charging material in the melting furnace, supplying hot furnace gases to fuse at least the upper portion of the material, protecting the upper surface of the metal plate from the corrosive action of the furnace gases by means of refractory material, causing the fused material to flow from the upper surface of the charge into the communicating chamber, cooling the lower surface of the metal plate so that as the fused material decomposes the refractory material, a portion of the fused material will be chilled and will protect the metal plate from the corrosive action of the hot furnace gases, and impinging a flame directly upon the tap hole to prevent material from solidifying therein.

ALFRED W. SCHEIDT.